US012606083B2

(12) United States Patent
Mukai

(10) Patent No.: US 12,606,083 B2
(45) Date of Patent: Apr. 21, 2026

(54) CONTROL SYSTEM FOR VEHICLE, CONTROL METHOD FOR VEHICLE, AND NON-TRANSITORY STORAGE MEDIUM

(71) Applicant: TOYOTA JIDOSHA KABUSHIKI KAISHA, Toyota (JP)

(72) Inventor: Fumiya Mukai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 18/928,608

(22) Filed: Oct. 28, 2024

(65) Prior Publication Data

US 2025/0236238 A1 Jul. 24, 2025

(30) Foreign Application Priority Data

Jan. 18, 2024 (JP) ................................. 2024-005867

(51) Int. Cl.
*H05B 47/115* (2020.01)
*B60Q 1/50* (2006.01)
(52) U.S. Cl.
CPC ............. *B60Q 1/50* (2013.01); *H05B 47/115* (2020.01)
(58) Field of Classification Search
CPC ...... H05B 47/115; H05B 47/125; B60Q 1/22; B60Q 1/50; B60Q 1/382; B60Q 1/525; B60Q 1/1423; B60Q 2400/50
See application file for complete search history.

(56) References Cited

U.S. PATENT DOCUMENTS

| 6,876,298 B2 * | 4/2005 | Litkouhi ................ B60Q 9/006 |
| | | 180/274 |
| 8,917,169 B2 * | 12/2014 | Schofield ............. H04N 13/239 |
| | | 348/148 |
| 9,969,261 B2 | 5/2018 | Kodama |
| 10,045,173 B1 | 8/2018 | Morimura et al. |
| 10,106,157 B2 | 10/2018 | Sawada et al. |
| 10,150,407 B2 | 12/2018 | Takahashi et al. |
| 10,696,297 B2 | 6/2020 | Nguyen Van et al. |
| 11,001,255 B2 | 5/2021 | Fukuman et al. |
| 11,110,937 B2 | 9/2021 | Kinoshita et al. |
| 12,454,220 B2 * | 10/2025 | Kawai .................... B60Q 1/324 |
| 2019/0001968 A1 | 1/2019 | Yorifuji et al. |
| 2019/0344828 A1 | 11/2019 | Omori et al. |
| 2019/0389488 A1 | 12/2019 | Yamada et al. |

FOREIGN PATENT DOCUMENTS

JP 2021-127071 A 9/2021

* cited by examiner

*Primary Examiner* — Tung X Le
(74) *Attorney, Agent, or Firm* — SoraIP, Inc.

(57) ABSTRACT

In a control system for a vehicle including a target detector, a road surface drawer, and a controller, the controller is configured to, when the target detector detects a target in a road surface drawing area that is an irradiation area of drawing light while the road surface drawer is performing road surface drawing, switch radiation of the drawing light by the road surface drawer from an ON state to a blinking state in which the ON state and an OFF state are repeated at a predetermined first period, and switch a detection period of the target detector to a second period that is an integral multiple of the first period to adjust a detection timing for the target to a timing at which the drawing light is brought into the OFF state.

3 Claims, 5 Drawing Sheets

CONTROL SYSTEM FOR VEHICLE, CONTROL METHOD FOR VEHICLE, AND NON-TRANSITORY STORAGE MEDIUM

CROSS-REFERENCE TO RELATED APPLICATION

This application claims priority to Japanese Patent Application No. 2024-005867 filed on Jan. 18, 2024, incorporated herein by reference in its entirety.

BACKGROUND

1. Technical Field

The present disclosure relates to a control system for a vehicle, a control method for a vehicle, and a non-transitory storage medium.

2. Description of Related Art

For example, Japanese Unexamined Patent Application Publication No. 2021-127071 (JP 2021-127071 A) discloses a technology in which drawing light is radiated from an in-vehicle lamp toward a road surface ahead of a vehicle and a pattern indication having regularity is drawn on the road surface so that both a driver and a pedestrian can quickly notice the presence of the pattern.

SUMMARY

In some cases, vehicles are equipped with cameras for detecting targets around the vehicles. In the vehicle equipped with the in-vehicle lamp as described in JP 2021-127071 A, when the road surface drawing and a target overlap each other, the camera may fail to detect the target properly or may erroneously detect the target due to the influence of the drawing light.

The technology of the present disclosure has been made in view of the above circumstances, and an object thereof is to effectively improve detection accuracy for a target when road surface drawing is performed.

In a control system for a vehicle according to the present disclosure, the vehicle includes: a target detector configured to detect a target existing in a predetermined area in a traveling direction of the vehicle at a predetermined detection period based on a captured image acquired by an imager configured to image the predetermined area; a road surface drawer configured to perform road surface drawing for drawing an indication of a specific pattern on a road surface in the predetermined area in the traveling direction of the vehicle by irradiating the road surface with drawing light; and a controller configured to control detection of the target by the target detector and the road surface drawing by the road surface drawer. The controller is configured to, when the target detector detects the target in a road surface drawing area that is an irradiation area of the drawing light while the road surface drawer is performing the road surface drawing, switch radiation of the drawing light by the road surface drawer from an ON state to a blinking state in which the ON state and an OFF state are repeated at a predetermined first period, and switch the detection period of the target detector to a second period that is an integral multiple of the first period to adjust a detection timing for the target to a timing at which the drawing light is brought into the OFF state.

In a control method for a vehicle according to the present disclosure, the vehicle includes: a target detector configured to detect a target existing in a predetermined area in a traveling direction of the vehicle at a predetermined detection period based on a captured image acquired by an imager configured to image the predetermined area; a road surface drawer configured to perform road surface drawing for drawing an indication of a specific pattern on a road surface in the predetermined area in the traveling direction of the vehicle by irradiating the road surface with drawing light; and a controller configured to control detection of the target by the target detector and the road surface drawing by the road surface drawer. The control method includes, when the target detector detects the target in a road surface drawing area that is an irradiation area of the drawing light while the road surface drawer is performing the road surface drawing, switching radiation of the drawing light by the road surface drawer from an ON state to a blinking state in which the ON state and an OFF state are repeated at a predetermined first period, and switching the detection period of the target detector to a second period that is an integral multiple of the first period to adjust a detection timing for the target to a timing at which the drawing light is brought into the OFF state.

A non-transitory storage medium according to the present disclosure stores a program for a computer of a control system for a vehicle. The vehicle includes: a target detector configured to detect a target existing in a predetermined area in a traveling direction of the vehicle at a predetermined detection period based on a captured image acquired by an imager configured to image the predetermined area; a road surface drawer configured to perform road surface drawing for drawing an indication of a specific pattern on a road surface in the predetermined area in the traveling direction of the vehicle by irradiating the road surface with drawing light; and a controller configured to control detection of the target by the target detector and the road surface drawing by the road surface drawer. The program causes the computer to perform a process comprising, when the target detector detects the target in a road surface drawing area that is an irradiation area of the drawing light while the road surface drawer is performing the road surface drawing, switching radiation of the drawing light by the road surface drawer from an ON state to a blinking state in which the ON state and an OFF state are repeated at a predetermined first period, and switching the detection period of the target detector to a second period that is an integral multiple of the first period to adjust a detection timing for the target to a timing at which the drawing light is brought into the OFF state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
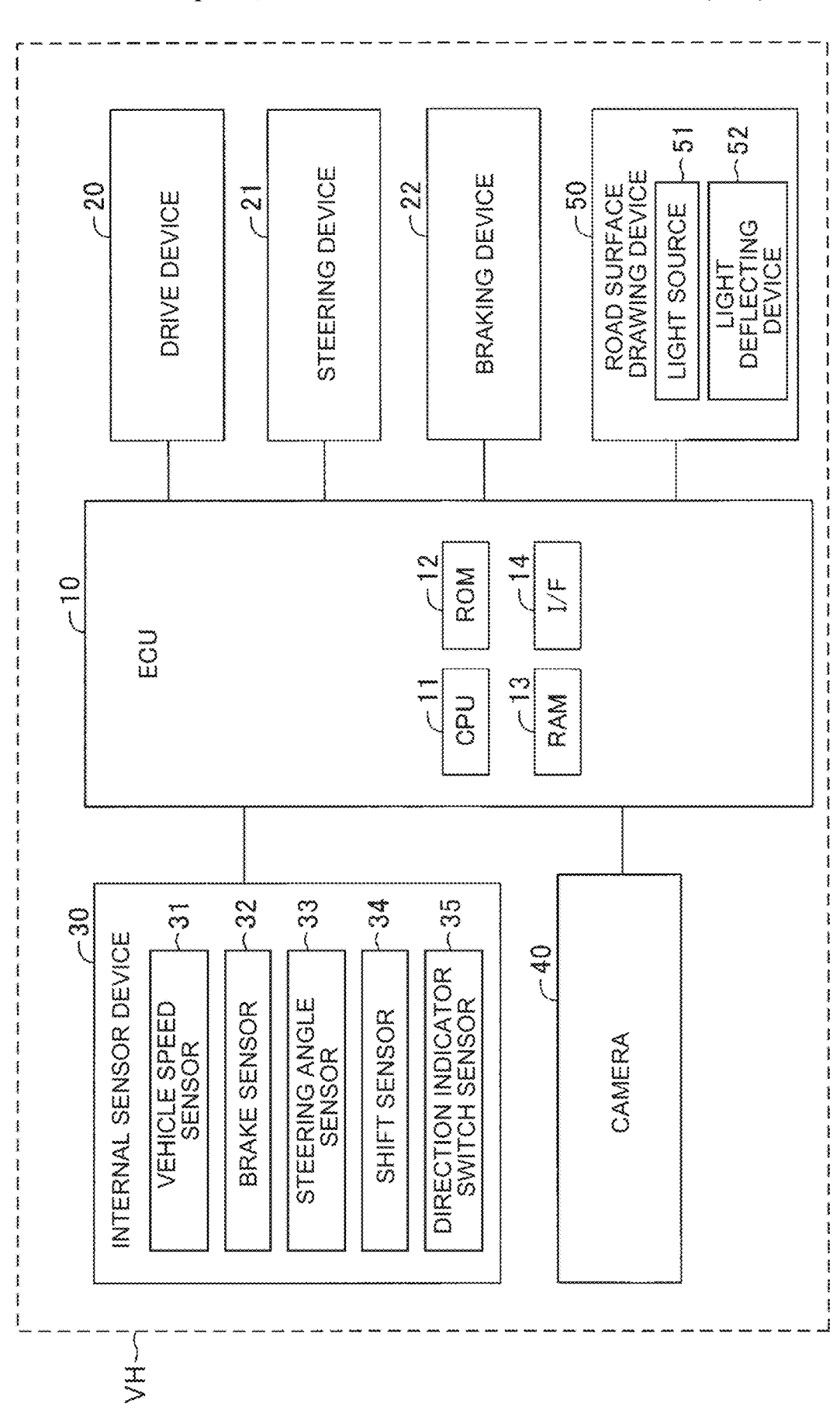
FIG. 1 is a schematic diagram illustrating a hardware configuration of a vehicle according to the present embodiment.

Hereinafter, a vehicle control system, a vehicle control method, and a program according to the present embodiment will be described with reference to the drawings.
Hardware Configuration FIG. 1 is a schematic diagram illustrating a hardware configuration of a vehicle VH according to the present embodiment.

The vehicle VH has ECU (Electronic Control Unit) 10. ECU 10 includes CPU (Central Processing Unit) 11, ROM (Read Only Memory) 12, RAM (Random Access Memory) 13, and interface device 14. CPU 11 is a processor that executes various programs stored in ROM 12. ROM 12 is a non-volatile memory (non-transitory storage medium) that stores data and the like required for CPU 11 to execute various programs. RAM 13 provides a working area to be deployed when various programs are executed by CPU 11. The interface device 14 is a communication device for communicating with an external device.

ECU 10 is a device serving as a center for performing various kinds of control of the vehicle VH. For this reason, the drive device 20, the steering device 21, the braking device 22, the internal sensor device 30, the camera 40, the road surface drawing device 50, and the like are communicably connected to ECU 10.

The drive device 20 generates a driving force to be transmitted to the driving wheels of the vehicle VH. Examples of the drive device 20 include an electric motor and an engine. In the present embodiment, the vehicle VH may be any of a hybrid electric vehicle (HEV), a plug-in Hybrid vehicle (PHEV), a fuel cell electric vehicle (FCEV), a battery electric vehicle (BEV), and an engine-driven vehicle. The steering device 21 applies a steering force to the wheels of the vehicle VH. The braking device 22 applies a braking force to the wheels of the vehicle VH.

The internal sensor device 30 is a sensor for acquiring the condition of the vehicle VH. Specifically, the internal sensor device 30 includes a vehicle speed sensor 31, a brake sensor 32, a steering angle sensor 33, a shift sensor 34, a direction indicator switch sensor 35, and the like.

The vehicle speed sensor 31 detects a traveling speed (vehicle speed) of the vehicle VH. The brake sensor 32 detects an operation amount of a brake pedal (not shown) by the driver. The steering angle sensor 33 detects a rotation angle (steering angle) of a steering wheel or a steering shaft (not shown). The shift sensor 34 detects shift positions (parking P, driving D, reverse R, neutral N, and the like) of the vehicle VH. The direction indicator switch sensor 35 detects ON and OFF of the direction indicator mounted on the vehicle VH. The internal sensor device 30 transmits the condition of the vehicle VH detected by the sensors 31 to 35 to ECU 10 at a predetermined cycle.

The camera 40 is an imager of the present disclosure, and captures an image of the surroundings of the vehicle VH. As the camera 40, for example, a digital camera having an image sensor such as a CMOS or a CCD can be used. The camera 40 transmits the captured image data to ECU 10 at a predetermined cycle.

The road surface drawing device 50 includes a light source 51, a light deflecting device 52, and the like. The road surface drawing device 50 irradiates the road surface with the drawing light from the light source 51 to draw a display of a graphic, a character, or the like having a predetermined pattern on the road surface. As the light source 51, for example, a semiconductor-emitting device such as a LED (Light Emitting Diode), LD (Laser Diode), or EL (Electro Luminescence) device can be used. The light deflecting device 52 irradiates the road surface with the drawing light emitted from the light source 51. For example, DMD (Digital Mirror Device) or the like can be used as the light-deflecting device 52. The light deflecting device 52 includes, for example, a micromirror array in which a plurality of micromirror elements are arranged in a matrix. The micromirror array can control ON and OFF of the respective mirror elements arranged in a matrix-like manner to form representations of various patterns of graphics, characters, and the like.

Figure 2A:
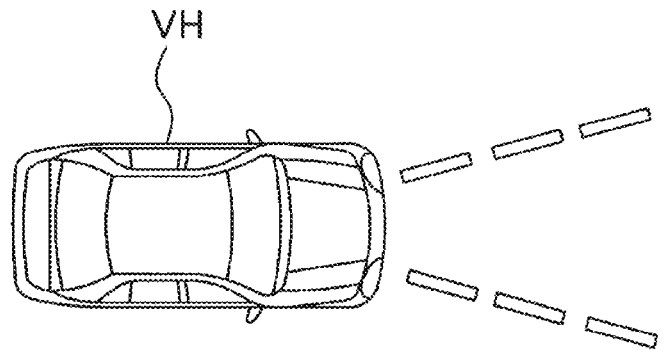
FIG. 2A is a schematic diagram illustrating an example of road surface drawing according to the present embodiment.
Figure 2B:
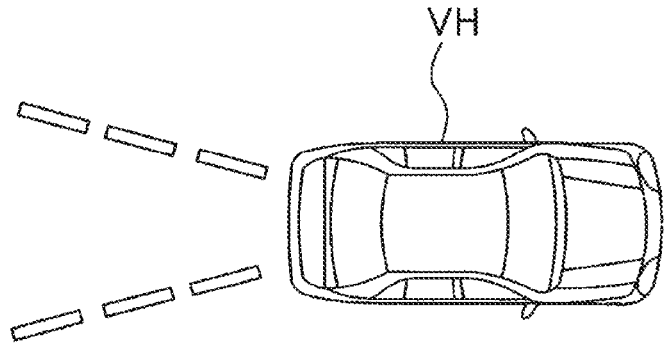
FIG. 2B is a schematic diagram illustrating an example of road surface drawing according to the present embodiment.
Figure 2C:
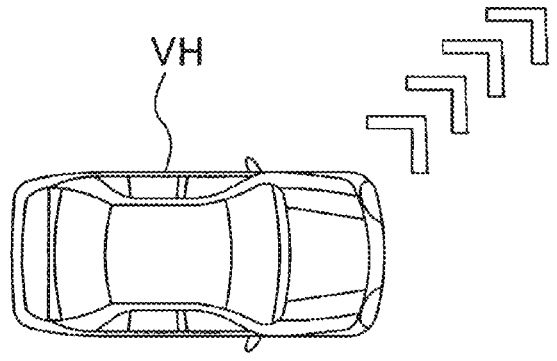
FIG. 2C is a schematic diagram illustrating an example of road surface drawing according to the present embodiment.
Figure 3:
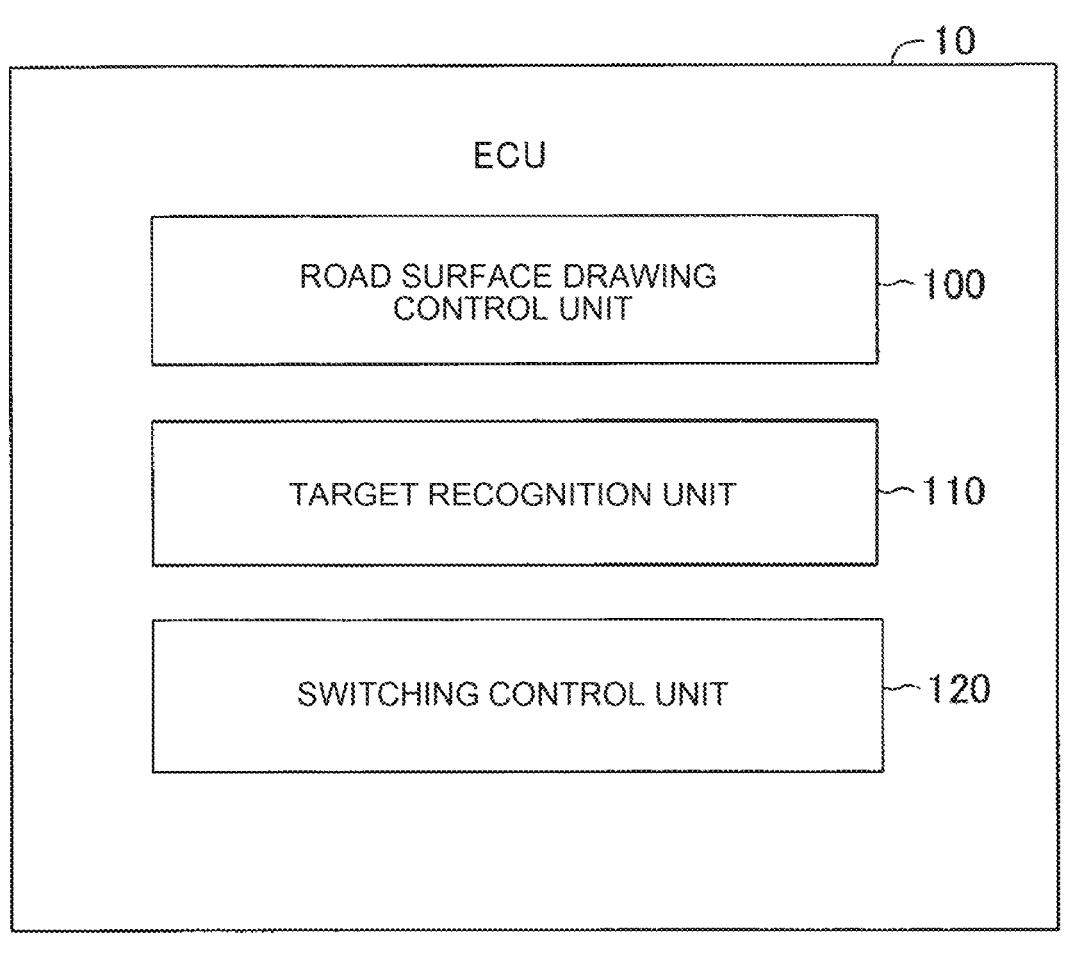
FIG. 3 is a schematic diagram illustrating a software configuration of the control device according to the present embodiment.

Each of FIG. 2A, FIG. 2B, and FIG. 2C is a schematic diagram illustrating an example of a display drawn on a road surface by the road surface drawing device 50. As shown in FIG. 2A, when the vehicle VH starts forward, for example, the road surface drawing device 50 draws a notification indication of a figure or the like constituted by two broken lines, a straight line, or the like on the front road surface which is the traveling direction of the vehicle VH. Further, as shown in FIG. 2B, when the vehicle VH starts backward, for example, the road surface drawing device 50 draws a notification display such as a figure constituted by two broken lines, a straight line, or the like on the rear road surface which is the traveling direction of the vehicle VH. Further, as shown in the drawing 2C, when the vehicle VH makes a left turn, for example, the road surface drawing device 50 draws a notification display such as a figure constituted by a broken line, a straight line, or the like on the left front road surface which is the traveling direction of the vehicle VH. When the vehicle VH makes a right turn, the road surface drawing device 50 draws on the right front road surface of the vehicle VH by reversing the notification shown in FIG. 2C. As described above, by drawing notification displays such as figures indicating the starting direction and the right-and-left turning direction of the vehicle VH on the road surface, the presence of the vehicle VH and the direction of the route can be effectively noticed by the surrounding pedestrians.
Software Configuration FIG. 3 is a schematic diagram illustrating a software configuration of ECU 10 according to the present embodiment. As illustrated in FIG. 3, ECU 10 includes a road surface drawing control unit 100, a target recognition unit 110, a switching control unit 120, and the like as functional elements. These functional elements 100 to 120 are realized by CPU 11 of ECU 10 reading a program stored in ROM 12 into a RAM 13 and executing the program. Note that all or a part of the functional elements 100 to 120 may be provided in another ECU separate from ECU 10 or in an information processing device of a facility (e.g., a control center) capable of communicating with the vehicle VH.

When the predetermined execution condition is satisfied, the road surface drawing control unit 100 transmits a drawing instruction signal to the road surface drawing device 50 (ON a drawing instruction signal). Thus, the road surface drawing control unit 100 executes road surface drawing control for causing the road surface drawing device 50 to draw a notification of a pattern corresponding to the situation on the road surface in the traveling direction of the vehicle VH. Examples of the execution condition include a forward start of the vehicle VH, a backward start of the vehicle VH, and a right-left turn of the vehicle VH.

When the vehicle VH starts moving forward, the road surface drawing control unit 100 causes the road surface drawing device 50 to draw the notification of the pattern shown in FIG. 2A on the front road surface of the vehicle VH. Whether or not the vehicle VH starts forward may be determined based on the determination by the shift sensor 34 or the brake sensor 32. When the vehicle VH starts backward, the road surface drawing control unit 100 causes the road surface drawing device 50 to render the notification of the pattern illustrated in FIG. 2B on the rear road surface of the vehicle VH. Whether or not the vehicle VH starts backward may be determined based on the findings of the shift sensor 34 and the brake sensor 32. When the vehicle VH turns left, the road surface drawing control unit 100 causes the road surface drawing device 50 to draw a notification of the pattern shown in FIG. 2C on the left front road surface of the vehicle VH. Whether the vehicle VH turns left may be determined based on the detection results of the direction indicator switch sensor 35, the steering angle sensor 33, the vehicle speed sensor 31, and the like. When the vehicle VH turns right, the road surface drawing control unit 100 causes the road surface drawing device 50 to render on the right front road surface of the vehicle VH by reversing the notification displays shown in FIG. 2C.

The target recognition unit 110 processes the image data transmitted from the camera 40 to recognize target information, which is information of a target (a surrounding vehicle, a pedestrian, a falling object, or the like) existing around the vehicle VH, at a predetermined recognition cycle (hereinafter, referred to as a reference recognition cycle). The target information is information indicating a type of the target detected around the vehicle VH, a relative distance between the vehicle VH and the target, a relative velocity between the vehicle VH and the target, and the like. The type of the target may be recognized by machine learning such as pattern matching, for example. The target object recognized by the target recognition unit 110 is used for driving support control such as parking support brake (PKSB), rear camera detection (RCD), and pre-crash safety (PCS). Driving assistance control is a concept including automatic driving control.

When recognizing a target object around VH of vehicles based on image-data captured by the camera 40, if the target object overlaps with the notification display drawn on the road surface, the target object may not be detected due to the effect of the drawing light or may be erroneously recognized as a relative distance. When various driving support controls are performed on the basis of such undetected or erroneous recognition, the accuracy of the control is lowered.

The switching control unit 120 switches the road surface drawing to a blinking state in which the road surface drawing is alternately switched between a lighting state and an off state in a predetermined blinking period (first period of the present disclosure) when the road surface drawing control overlaps with an area of the notification display in which the target is drawn on the road surface (hereinafter referred to as a road surface drawing area) during execution of the road surface drawing control, and synchronizes the recognition period of the target based on the image data with the blinking period of the road surface drawing. As a result, the switching control unit 120 executes switching control for suppressing undetected or erroneous recognition of the target object. Hereinafter, the details of the switching control process performed by the switching control unit 120 will be described.

Figure 4:
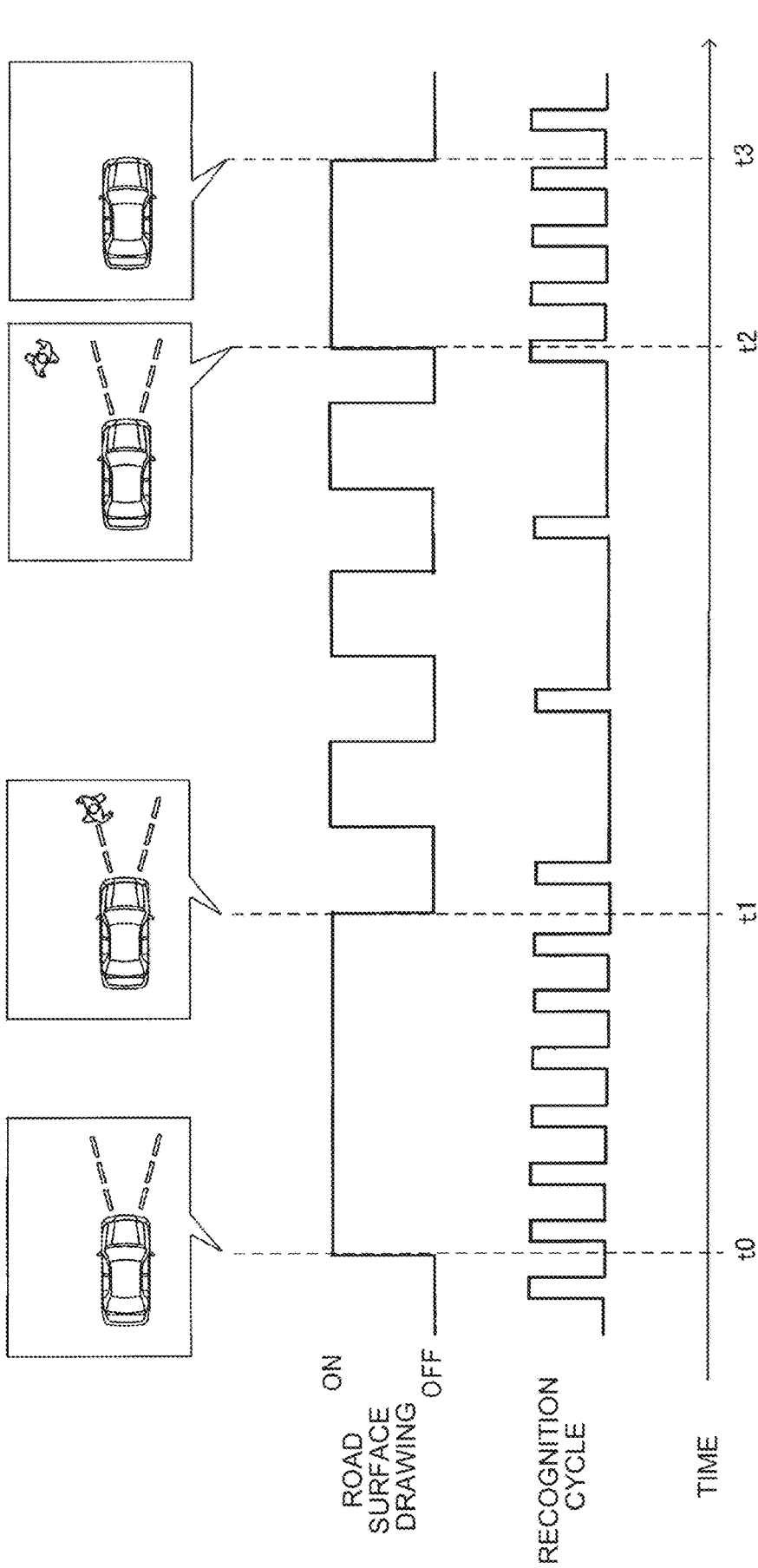
FIG. 4 is a timing chart illustrating a flow of a switching control process according to the present embodiment.

FIG. 4 is a timing chart illustrating a flow of a switching control process. When the execution condition of the road surface drawing is satisfied at the time to, the road surface drawing control unit 100 starts the road surface drawing (that is, ON the drawing instruction signal). The time t1 is a timing at which the target object existing in the photographing area of the camera 40 overlaps with the road surface drawing area, that is, a timing at which the target object enters the road surface drawing area. The road surface drawing control unit 100 continuously turns on the light source 51 of the road surface drawing device 50 (that is, continuously turns ON the drawing instruction signal) from the time t0 to the time t1. Further, during a period from prior to the time t0 to the time t1, the target recognition unit 110 recognizes the target around the vehicle VH at the reference recognition period based on the image data captured by the camera 40.

When the target object overlaps with the road surface drawing area at the time t1, the switching control unit 120 switches the light source 51 of the road surface drawing device 50 to a blinking condition that blinks at a predetermined blinking cycle. That is, the drawing instruction signal transmitted from the road surface drawing control unit 100 to the road surface drawing device 50 is repeatedly turned ON/OFF. Further, when the target object overlaps with the road surface drawing area at the time t1, the switching control unit 120 switches the recognition period of the target object by the target recognition unit 110 to a specific recognition period (second period of the present disclosure) which is an integral multiple of the blinking period, so that the recognition timing of the target object is adjusted to the timing of turning off the road surface drawing. That is, the target can be recognized without being affected by the drawing light emitted from the road surface drawing device 50. As a result, it is possible to effectively suppress erroneous recognition such as non-detection and relative distance of a target object overlapping with the notification display drawn on the road surface.

When the target does not overlap with the road surface drawing area at the time t2, the switching control unit 120 ends the switching control. That is, the light source 51 of the road surface drawing device 50 is continuously turned on (the drawing instruction signal is continuously turned ON), and the recognition timing of the target object is returned to the normal reference recognition cycle. After that, when the predetermined termination condition is satisfied at the time t3, the road surface drawing control unit 100 terminates the road surface drawing (that is, turns OFF the drawing instruction signal). Although there is no particular limitation on the termination condition, for example, when the vehicle VH is moving backward, the termination condition may be satisfied at a timing at which the shift sensor 34 detects a shift position other than the reverse R. When the vehicle VH is turned right and left, for example, the termination condition may be satisfied at a timing at which the direction indicator switch sensor 35 detects OFF.

Figure 5:
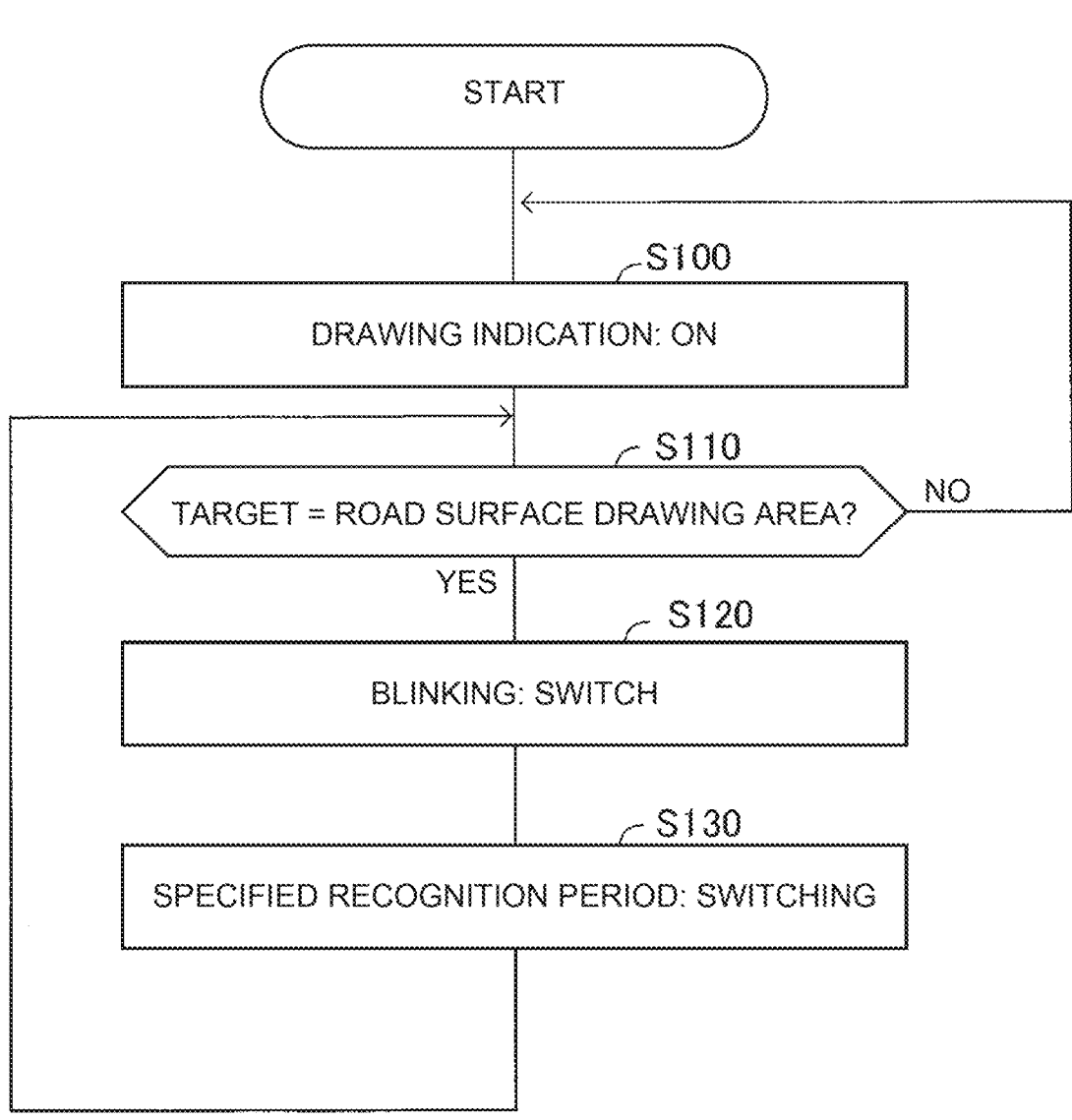
FIG. 5 is a flowchart for explaining a routine of processing of road surface rendering control, image recognition control, and switching control according to the present embodiment.

Next, a process of road surface drawing control, image-recognition control, and switching control by CPU 11 of ECU 10 will be described with reference to FIG. 5. This routine is started when the execution condition of the road surface drawing is satisfied, and ends when the completion condition of the road surface drawing is satisfied.

In S100, ECU 10 performs road surface drawing control for causing the road surface drawing device 50 to draw the notification of the pattern corresponding to the situation on the road surface in the traveling direction of the vehicle VH by turning ON the drawing instruction signal. Next, in S110, ECU 10 determines whether or not the target object present in the imaging area of the camera 40 has entered the road surface drawing area. If the target falls within the road surface drawing area (Yes), ECU 10 proceeds to S120 process. On the other hand, when the target is not in the road surface drawing area (No), ECU 10 returns to S100 process.

In S120, ECU 10 switches the light source 51 of the road surface drawing device 50 to a blinking condition that blinks at a predetermined blinking cycle. In addition, in S130, ECU 10 switches the recognition period of the target to a particular recognition period that is an integral multiple of the blinking period. Note that the processes of S120 and S130 are not sequential, and may be concurrent. Thereafter, ECU 10 repeatedly executes S130 process from the above-described S100 until the road surface drawing is completed.

Although the vehicle control system, the vehicle control method, and the program according to the present embodiment have been described above, the present disclosure is not limited to the above embodiment, and various modifications can be made without departing from the object of the present disclosure.

What is claimed is:

1. A control system for a vehicle,
the vehicle including:
   a target detector configured to detect a target existing in a predetermined area in a traveling direction of the vehicle at a predetermined detection period based on a captured image acquired by an imager configured to image the predetermined area;
   a road surface drawer configured to perform road surface drawing for drawing an indication of a specific pattern on a road surface in the predetermined area in the traveling direction of the vehicle by irradiating the road surface with drawing light; and
   a controller configured to control detection of the target by the target detector and the road surface drawing by the road surface drawer, wherein
the controller is configured to,
when the target detector detects the target in a road surface drawing area that is an irradiation area of the drawing light while the road surface drawer is performing the road surface drawing,
   switch radiation of the drawing light by the road surface drawer from an ON state to a blinking state in which the ON state and an OFF state are repeated at a predetermined first period, and
   switch the detection period of the target detector to a second period that is an integral multiple of the first period to adjust a detection timing for the target to a timing at which the drawing light is brought into the OFF state.

2. A control method for a vehicle,
the vehicle including:
   a target detector configured to detect a target existing in a predetermined area in a traveling direction of the vehicle at a predetermined detection period based on a captured image acquired by an imager configured to image the predetermined area;
   a road surface drawer configured to perform road surface drawing for drawing an indication of a specific pattern on a road surface in the predetermined area in the traveling direction of the vehicle by irradiating the road surface with drawing light; and
   a controller configured to control detection of the target by the target detector and the road surface drawing by the road surface drawer,
the control method comprising,
when the target detector detects the target in a road surface drawing area that is an irradiation area of the drawing light while the road surface drawer is performing the road surface drawing,
   switching radiation of the drawing light by the road surface drawer from an ON state to a blinking state in which the ON state and an OFF state are repeated at a predetermined first period, and
   switching the detection period of the target detector to a second period that is an integral multiple of the first period to adjust a detection timing for the target to a timing at which the drawing light is brought into the OFF state.

3. A non-transitory storage medium storing a program for a computer of a control system for a vehicle,
the vehicle including:
   a target detector configured to detect a target existing in a predetermined area in a traveling direction of the vehicle at a predetermined detection period based on a captured image acquired by an imager configured to image the predetermined area;
   a road surface drawer configured to perform road surface drawing for drawing an indication of a specific pattern on a road surface in the predetermined area in the traveling direction of the vehicle by irradiating the road surface with drawing light; and
   a controller configured to control detection of the target by the target detector and the road surface drawing by the road surface drawer,
the program causing the computer to perform a process comprising,
when the target detector detects the target in a road surface drawing area that is an irradiation area of the drawing light while the road surface drawer is performing the road surface drawing,
   switching radiation of the drawing light by the road surface drawer from an ON state to a blinking state in which the ON state and an OFF state are repeated at a predetermined first period, and
   switching the detection period of the target detector to a second period that is an integral multiple of the first period to adjust a detection timing for the target to a timing at which the drawing light is brought into the OFF state.

* * * * *